J. H. BROWN.
SEED TESTER.
APPLICATION FILED AUG. 11, 1909.
984,746.
Patented Feb. 21, 1911.
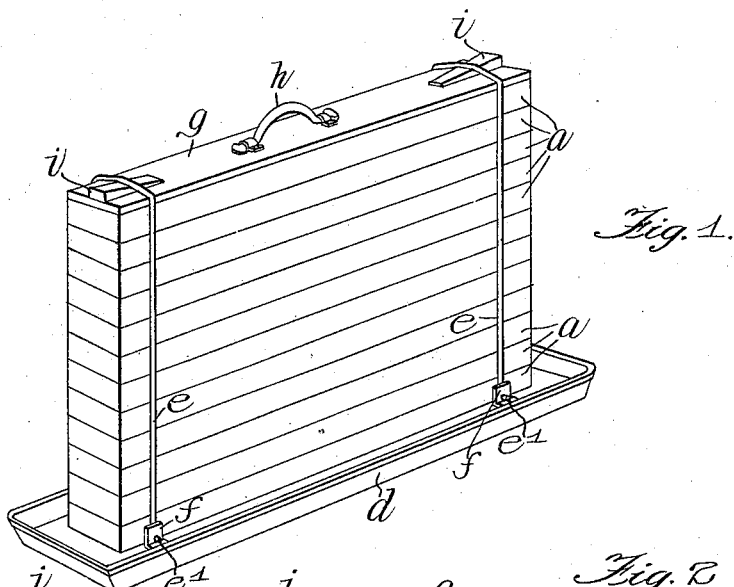
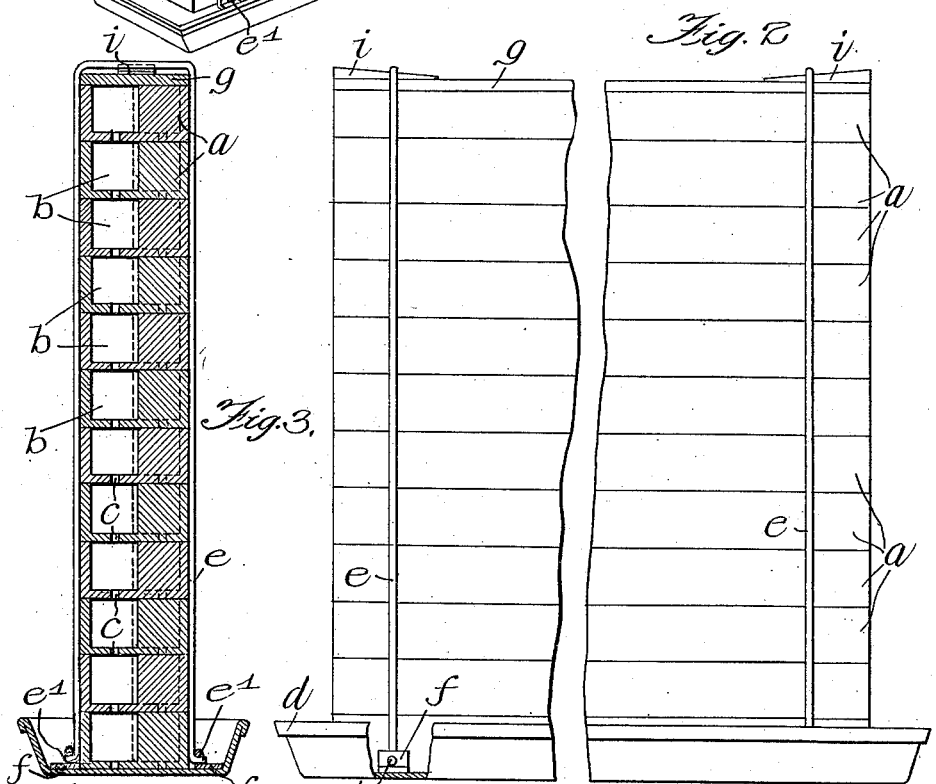
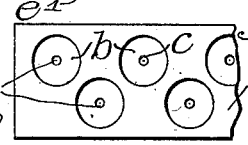
Inventor:
James H. Brown
By Cheever & Cox
Atty.

UNITED STATES PATENT OFFICE.

JAMES H. BROWN, OF ST. CHARLES, ILLINOIS.

SEED-TESTER.

984,746.   Specification of Letters Patent.   Patented Feb. 21, 1911.

Application filed August 11, 1909. Serial No. 512,360.

*To all whom it may concern:*

Be it known that I, JAMES H. BROWN, a citizen of the United States, residing at St. Charles, in the county of Kane and State of Illinois, have invented a certain new and useful Improvement in Seed-Testers, of which the following is a specification.

The embodiment of my invention is a seed tester and is adapted for use by agriculturists and others for determining whether or not seed will germinate properly if planted.

It will be understood that persons desiring to plant corn for example, desire to know whether the kernels of an ear of seed corn will grow if planted in the field, and one of the best ways to test this is to take three or four kernels from the ear and plant them in circumstances similar to those that will obtain in the field. If the kernels from any particular ear fail to germinate properly, the ear from which they were obtained will be discarded, at least for seed purposes.

Having this practice in mind, the objects of my invention are:—First. To provide a seed tester compact in form, readily portable, convenient to use and of large capacity. Second. To provide a seed tester so constructed that the implantations may be moistened in series or columns instead of one at a time. Third. To provide a construction such that the implantations will all be properly drained and fermentation of the soil will be avoided. Fourth. To provide certain details of construction hereinafter set forth.

I obtain my objects by the construction illustrated in the accompanying drawings, in which—

Figure 1 is a perspective view of the complete tester. Fig. 2 is a side view thereof. Fig. 3 is a transverse sectional elevation, and Fig. 4 a plan view of a fragment of one of the units.

Similar letters refer to similar parts throughout the several views.

The body of the tester consists of a number of units $a$ of uniform size each having a number of receptacles $b$ which are open at the top and closed at the bottom, except for small apertures $c$. The receptacles are arranged approximately in the same relative positions in the different units so that when the units are superposed the receptacles will communicate one with another, as clearly shown in Fig. 3. The pan $d$, the dimensions whereof are somewhat greater than the dimensions of the units, is provided with bails $e$ pivoted to the pan in any suitable manner, for example, by means of the lugs $f$ secured inside of the pan and having eyes adapted to receive the bent over ends of the bails. A top $g$, which is preferably of the same horizontal dimensions as the units, is provided with a handle $h$. It is secured in place preferably by means of wedges $i$ inserted between the top of the cover and the bend of the bails.

In operation, the receptacles $b$ are filled with earth, sand or whatever substance is desired for producing germination of the seed. The substance is then moistened and the seeds implanted therein, after which the units are stacked one upon another in the pan $d$. The cover $g$ is then placed upon the top unit and the bails $b$ swung over them and the parts locked tightly in position by means of the wedges. As the receptacles arrange themselves in columns when the parts are thus assembled, the moisture will drain through the apertures $c$ from one receptacle to another until all are moistened. The overflow will be caught in the drip pan $d$ and will thus be prevented from doing any damage to the surrounding objects. For subsequent moistenings during germination it is necessary only to pour water into the receptacles in the top unit, after which gravity will produce gradual downward flow as above described.

One advantage in locking the parts together, as above mentioned, is that the moisture is conserved, which reduces the amount of attention which need be paid to the device during use. Another advantage is that the parts are securely held together and there is no danger of their coming apart when being moved from place to place.

In use, the tester and its contents will be kept as nearly as possible at a temperature which will readily cause germination, for example, approximately in the neighborhood of 70 degrees F.

It will be noted that the principle of operation of my apparatus is such that the conditions of nature will be very closely approximated. The water filtering down from one receptacle to another gives perfect drainage and circulation and prevents the soil from fermenting or souring. Moreover the movement of the moisture is gradual with the result that no flooding or washing away of the soil substance can occur.

Having thus described my invention what I claim as new and desire to secure by Letters Patent is:—

1. A seed tester comprising a number of superposed sections, each section having a number of non communicating receptacles therein, each receptacle being closed at the bottom except for a small aperture whereby drainage and filtration are permitted and the germinating medium retained, the receptacles being so arranged that when the sections are superposed, one receptacle will drain into another in the section beneath.

2. A seed tester comprising a number of superposed sections, each section having a number of non communicating receptacles therein, each receptacle being closed at the bottom except for a small, substantially centrally located, aperture, the receptacles being so arranged as to lie one substantially directly over the other whereby the moisture descending from one receptacle is deposited substantially at the center of the top of the one beneath.

3. A seed tester comprising a number of superposed sections, each section having a number of non communicating receptacles therein, each receptacle being closed at the bottom except for a small aperture, one receptacle being located substantially directly above another in the assembled apparatus, a pan adapted to serve as a base having projecting upturned edges, and means for releasably securing the parts together.

4. A seed tester comprising a number of superposed sections, each section having a number of non communicating receptacles therein, each receptacle being closed at the bottom except for a small aperture, one receptacle being located substantially directly above another in the assembled appartus, a pan adapted to serve as a base having projecting upturned edges, blades pivoted to said pan near the ends thereof and adapted to swing over and engage the top section for releasably holding the parts together.

In witness whereof, I have hereunto subscribed my name in the presence of two witnesses.

JAMES H. BROWN.

Witnesses:
  HOWARD M. COX,
  G. L. CRAGG.